US011394632B2

(12) United States Patent
Mohanty et al.

(10) Patent No.: US 11,394,632 B2
(45) Date of Patent: Jul. 19, 2022

(54) SYSTEMS AND METHODS FOR DETERMINING NETWORK COMPONENT SCORES USING BANDWIDTH CAPACITY

(71) Applicant: Cisco Technology Inc., San Jose, CA (US)

(72) Inventors: Satya Ranjan Mohanty, San Ramon, CA (US); Mankamana Prasad Mishra, Dublin, CA (US); Ali Sajassi, San Ramon, CA (US); Mrinmoy Ghosh, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 140 days.

(21) Appl. No.: 16/696,203

(22) Filed: Nov. 26, 2019

(65) Prior Publication Data

US 2020/0351186 A1    Nov. 5, 2020

Related U.S. Application Data

(60) Provisional application No. 62/843,108, filed on May 3, 2019.

(51) Int. Cl.
*H04L 49/25* (2022.01)
*H04L 43/0882* (2022.01)
(Continued)

(52) U.S. Cl.
CPC .......... *H04L 43/0882* (2013.01); *H04L 12/18* (2013.01); *H04L 12/4641* (2013.01);
(Continued)

(58) Field of Classification Search
None
See application file for complete search history.

(56) References Cited

U.S. PATENT DOCUMENTS

| 9,571,570 B1 * | 2/2017 | Mutnuru | G06F 3/0635 |
| 2015/0067033 A1 * | 3/2015 | Martinsen | H04L 47/00 |
| | | | 709/203 |

(Continued)

OTHER PUBLICATIONS

Resch, James, "New Hashing Algorithms for Data Storage", Cleversafe, Storage Developer Conference, SNIA, Santa Clara, 2015 https://www.snia.org/sites/default/files/SDC15_presentations/dist_sys/Jason_Resch_New_Consistent_Hashings_Rev.pdf (Year: 2015).*

(Continued)

*Primary Examiner* — Jenkey Van
(74) *Attorney, Agent, or Firm* — Baker Botts, LLP

(57) ABSTRACT

In one embodiment, a method includes receiving, by a first router, data from a network component. The method also includes determining, by the first router, a first link bandwidth capacity between the first router and a host device and determining, by the first router, a first score for the first router based on the first link bandwidth capacity. The method also includes determining, by the first router, a second link bandwidth capacity between a second router and the host device and determining, by the first router, a second score for the second router based on the second link bandwidth capacity. The method further includes comparing, by the first router, at least the first score and the second score to determine a highest score and assigning, by the first router, an edge router associated with the highest score to communicate the data to the host device.

17 Claims, 4 Drawing Sheets

(51) Int. Cl.
  *H04L 12/66* (2006.01)
  *H04L 12/18* (2006.01)
  *H04L 12/46* (2006.01)
  *H04L 69/326* (2022.01)

(52) U.S. Cl.
  CPC .............. *H04L 12/66* (2013.01); *H04L 49/25* (2013.01); *H04L 69/326* (2013.01)

(56) References Cited

U.S. PATENT DOCUMENTS

2018/0287946 A1* 10/2018 Nagarajan ............... G06F 9/542
2020/0280507 A1* 9/2020 Chen ....................... H04L 45/22

OTHER PUBLICATIONS

Kamber, M., Pei, J., Han, J. (2011). Data Mining: Concepts and Techniques. Netherlands: Elsevier Science. (Year: 2011).*

Stewart, James (2003). Calculus: early transcendentals. (Year: 2003).*

Sajassi, A. et al., "BGP MPLS-Based Ethernet VPN," Internet Engineering Task Force (IETF), https://tools.ietf.org/html/rfc7432, dated Feb. 2015, 56 pages.

Rabadan, J. et al. "Framework for Ethernet VPN Designated Forwarder Election Extensibility," https://tools.ietf.org/html/rfc8584, dated Apr. 2019, 32 pages.

Malhotra, N. et al., Weighted Multi-Path Procedures for EVPN All-Active Multi-Homing draft-ietf-bess-evpn-unequal-1b-00, https://tools.ietf.org/html/draft-ietf-bess-evpn-unequal-lb-00, dated Sep. 19, 2018, 18 pages.

Mohanty, S. et al., Weighted HRW and its applications draft-mohanty-bess-weighted-hrw-00, https://tools.ietf.org/html/draft-mohanty-bess-weighted-hrw-00, dated Mar. 11, 2019, 11 pages.

Mohapatra, P. et al., "BGP Link Bandwidth Extended Community draft-ietf-idr-link-bandwidth-07.txt," https://tools.ietf.org/html/draft-ietf-idr-link-bandwidth-07, Mar. 5, 2018, 5 pages.

Gredler, H. et al., North-Bound Distribution of Link-State and TE Informtaion using BGP draft-ietf-idr-ls-distribution-05, https://tools.ietf.org/html/draft-ietf-idr-ls-distribution-05, May 21, 2014, 36 pages.

* cited by examiner

SYSTEMS AND METHODS FOR DETERMINING NETWORK COMPONENT SCORES USING BANDWIDTH CAPACITY

CROSS-REFERENCE TO RELATED APPLICATIONS

This application claims benefit of U.S. Provisional Application No. 62/843,108 filed May 3, 2019, by Satya Ranjan Mohanty et al., and entitled "Bandwidth Aware EVPN DF Election Procedure," which is incorporated herein by reference.

TECHNICAL FIELD

This disclosure generally relates to determining network component scores, and more specifically to systems and methods for determining network component scores using bandwidth capacity.

BACKGROUND

In a networking environment, a plurality of objects may be mapped to a plurality of network components. The plurality of network components may change due to a network component either being removed from or added to the networking environment. As a result of this change, the objects may be remapped to the viable network components. This remapping of the objects may cause widespread disruption within the networking environment.

DESCRIPTION OF EXAMPLE EMBODIMENTS

Overview

Figure 1:
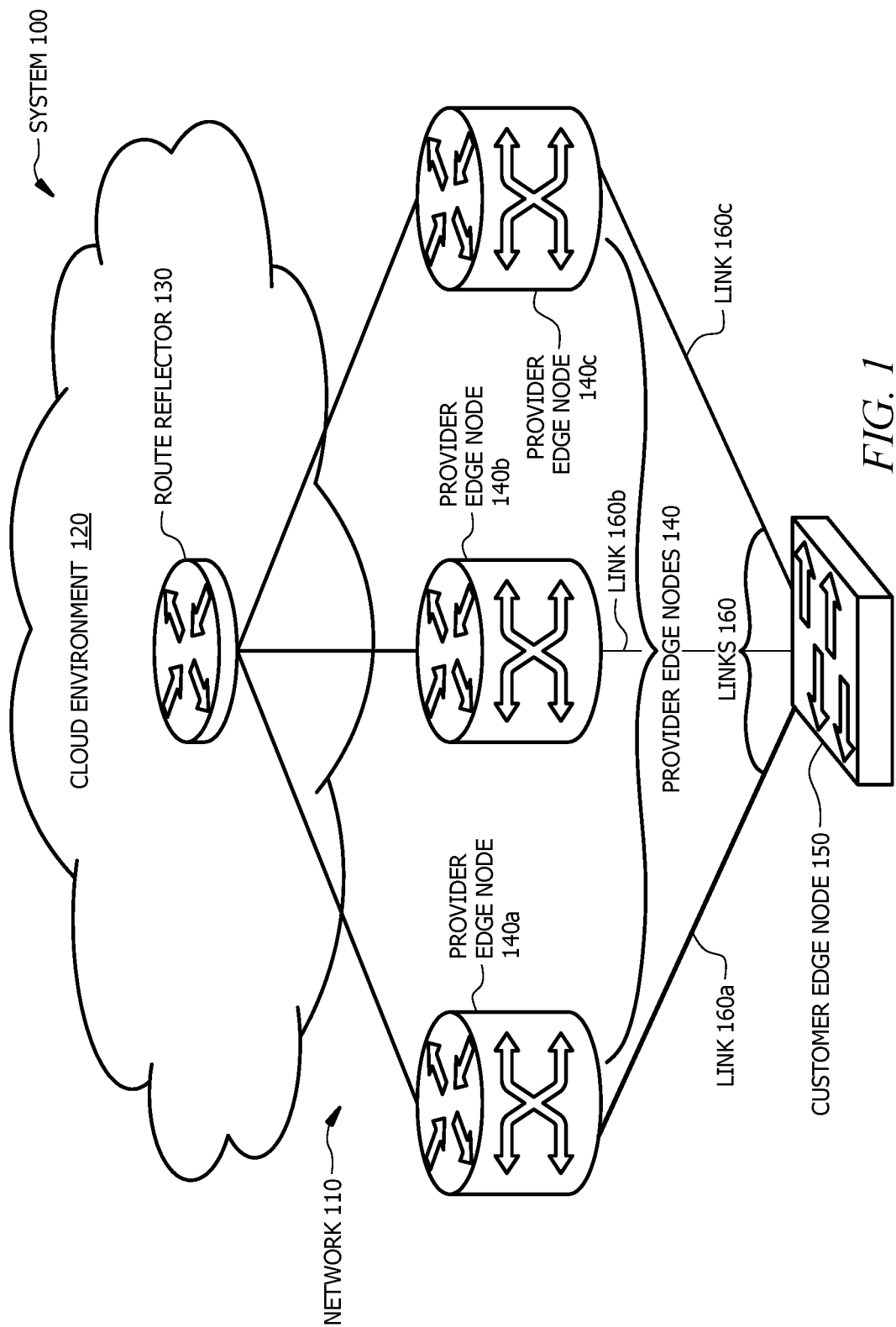
FIG. 1 illustrates an example system for determining network component scores using bandwidth capacity.

According to an embodiment, a system includes one or more processors and one or more computer-readable non-transitory storage media coupled to the one or more processors. The one or more computer-readable non-transitory storage media include instructions that, when executed by the one or more processors, cause one or more routers to perform operations including receiving data from a network component, determining a first link bandwidth capacity between a first router and a host device, and determining a first score for the first router based on the first link bandwidth capacity. The operations also include determining a second link bandwidth capacity between a second router and the host device and determining a second score for the second router based on the second link bandwidth capacity. The operations further include comparing at least the first score and the second score to determine a highest score and assigning an edge router associated with the highest score to communicate the data to the host device.

The operations may also include determining that the second link bandwidth capacity between the second router and the host device has changed from the second link bandwidth capacity to a revised second link bandwidth capacity. The operations may include revising the second score for the second router based on the revised second link bandwidth capacity to generate a revised second score for the second router. The operations may include comparing at least the first score and the revised second score to determine a highest score and reassigning the edge router associated with the highest score to communicate the first data to the host device.

Determining the first score for the first router based on the first link bandwidth capacity may include one or more of the following: determining a first router identifier for the first router; determining a data identifier for the data; calculating a normalized hash value of the first router identifier and the data identifier; calculating a natural logarithm of the normalized hash value; and dividing the natural logarithm of the normalized hash value by the first link bandwidth capacity to generate the first score. The data identifier may be associated with one of the following: an ethernet virtual private network (EVPN) instance (EVI) identifier or a bridge domain (BD) identifier. The edge router associated with the highest score may be a designated forwarder (DF) provider edge router. The data received from the network component may be associated with a multicast flow. The network component may be a router reflector for Border Gateway Protocol (BGP).

According to another embodiment, a method includes receiving, by a first router, data from a network component. The method also includes determining, by the first router, a first link bandwidth capacity between the first router and a host device and determining, by the first router, a first score for the first router based on the first link bandwidth capacity. The method also includes determining, by the first router, a second link bandwidth capacity between a second router and the host device and determining, by the first router, a second score for the second router based on the second link bandwidth capacity. The method further includes comparing, by the first router, at least the first score and the second score to determine a highest score and assigning, by the first router, an edge router associated with the highest score to communicate the data to the host device.

According to yet another embodiment, one or more computer-readable non-transitory storage media embody instructions that, when executed by a processor, cause the processor to perform operations including receiving data from a network component, determining a first link bandwidth capacity between a first router and a host device, and determining a first score for the first router based on the first link bandwidth capacity. The operations also include determining a second link bandwidth capacity between a second router and the host device and determining a second score for the second router based on the second link bandwidth capacity. The operations further include comparing at least the first score and the second score to determine a highest score and assigning an edge router associated with the highest score to communicate the data to the host device.

Technical advantages of certain embodiments of this disclosure may include one or more of the following. Certain embodiments of this disclosure may reduce the computation of the network component scores from the product of the number of network components (e.g., the number of routers or servers) and the number of objects to just the number of objects (e.g., the number of flows). This reduction may result in significant savings in the context of virtual Ethernet Segment (ES) since several ESs may use the same physical link. Certain embodiments of this disclosure may reduce or eliminate disruption within a networking environment since very little movement of veins occurs between provider edges in the DF context. Certain embodiments of this disclosure provide a true Highest Random Weight (HRW) solution that is not stateful. As yet another advantage, embodiments of this disclosure may become more efficient as the number of VLANs, EVI identities, BD identities, and the like increase. Embodiments of this disclosure may solve the weighted DF load balancing problem in EVPN with minimal disruption. Certain embodiments described herein may be used for resilient hashing in unequal cost multipath (UCMP) load balancing in the forwarding information base (FIB).

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Embodiments of this disclosure include systems and methods for determining network component scores using bandwidth capacity. Provider edge nodes of a network may receive data from a route reflector, and the provider edge node with the highest score is assigned to communicate the data to a customer edge node. The scores are determined using a weighted bandwidth context rather than a normalized weight associated with the provider edge node. As such, when a weight associated with a provider edge node (e.g., a router or server) changes, only the weight associated with the affected provider edge node needs to be computed. The weights associated with the other provider edge nodes do not need to be computed again.

Figure 2:
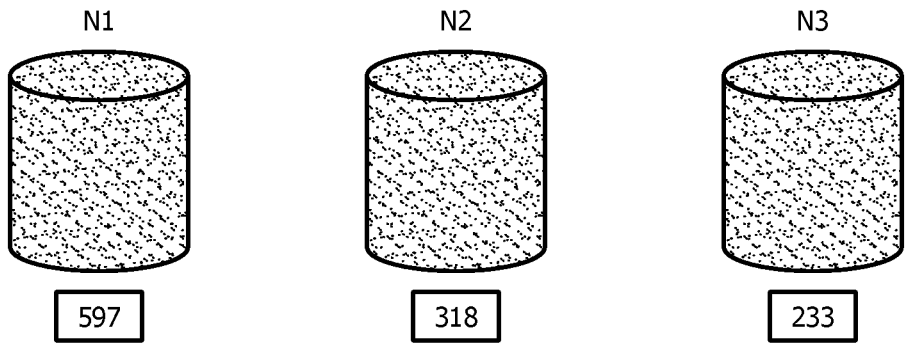
FIG. 2 illustrates an example system for mapping objects to network components using network component scores.
Figure 3:
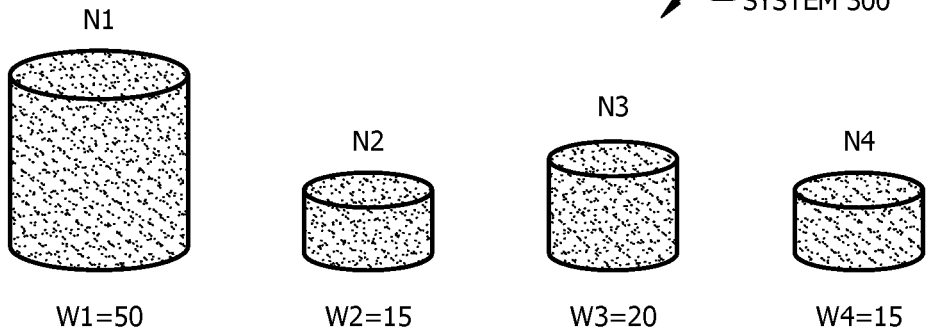
FIG. 3 illustrates an example system for determining network component scores using normalized weights.
Figure 4:
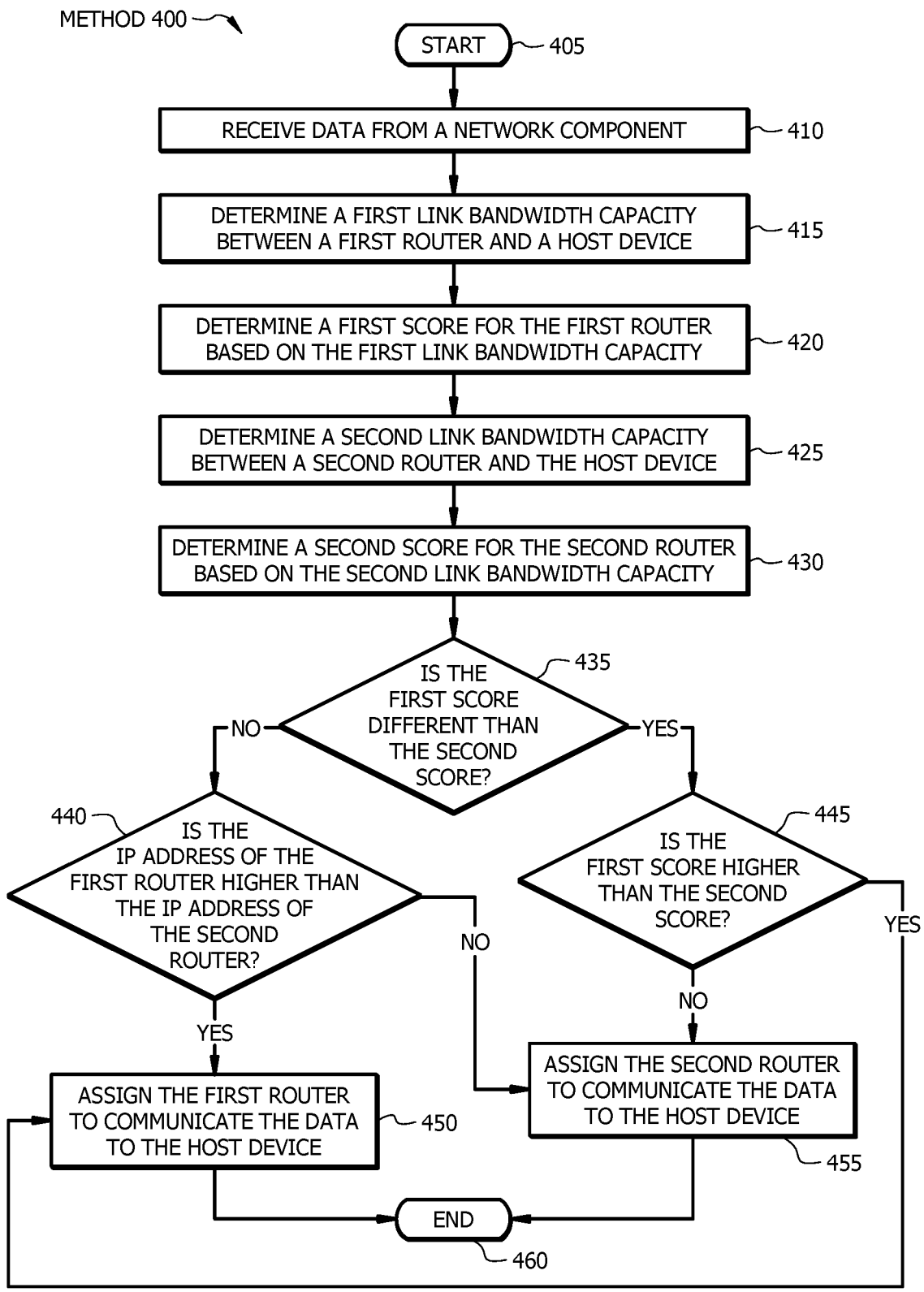
FIG. 4 illustrates an example method for determining network component scores using bandwidth capacity.
Figure 5:
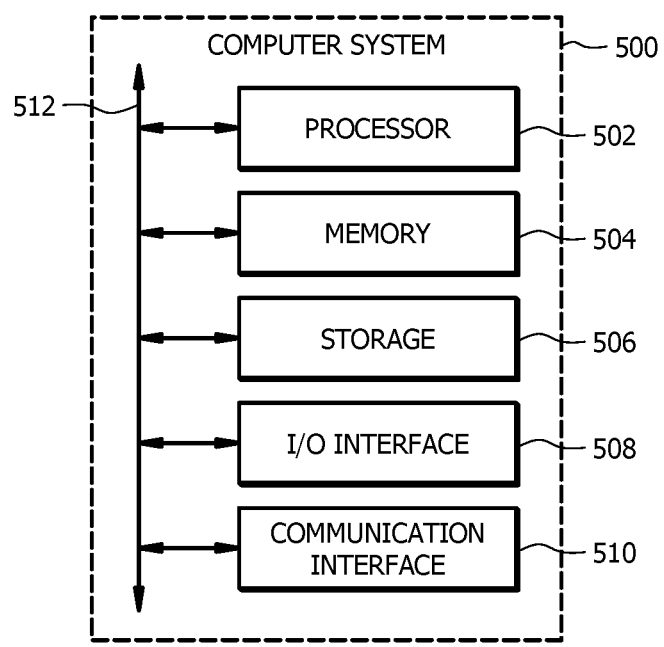
FIG. 5 illustrates an example computer system that may be used by the systems and methods described herein.

FIG. 1 shows an example system for determining network component scores using bandwidth capacity. FIG. 2 shows an example system for mapping objects to network components using network component scores, and FIG. 3 shows an example system for determining network component scores using normalized weights. FIG. 4 shows an example method for determining network component scores using bandwidth capacity. FIG. 5 shows an example computer system that may be used by the systems and methods described herein.

FIG. 1 illustrates an example system 100 for determining network component scores using bandwidth capacity. System 100 or portions thereof may be associated with an entity, which may include any entity, such as a business or company (e.g., a service provider) that determines network component scores using bandwidth capacity. The components of system 100 may include any suitable combination of hardware, firmware, and software. For example, the components of system 100 may use one or more elements of the computer system of FIG. 5.

System 100 includes a network 110, a cloud environment 120, a route reflector 130, provider edge nodes 140, a customer edge node 150, and links 160. Network 110 of system 100 is any type of network that facilitates communication between components of system 100. Network 110 may connect one or more components of system 100. This disclosure contemplates any suitable network. One or more portions of network 110 may include an ad-hoc network, an intranet, an extranet, a VPN (e.g., an Ethernet VPN (EVPN)), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. In certain embodiments, one or more portions of network 110 may utilize Multiprotocol Label Switching (MPLS). For example, one or more portions of network 110 may be an MPLS VPN. Network 110 of system 100 may include one or more cloud networks.

Cloud environment 120 of system 100 is a network environment that provides on-demand computer system resources (e.g., data storage and computing power) without direct active management by a user. Cloud environment 120 may include one or more data centers available to many users over the Internet. Cloud environment 120 may be limited to a single organization (e.g., an enterprise cloud environment) or be available to many organizations (e.g., a public cloud environment). In certain embodiments, cloud environment 120 is an internal BGP (iBGP) cloud environment. Cloud environment 120 of FIG. 1 includes route reflector 130.

Route reflector 130 of system 100 is a network routing component for BGP. Route reflector 130 may be a router that acts as a routing information exchange server for other iBGP routers. Route reflector 130 may advertise routes between internal BGP peers (e.g., provider edge nodes 140). A new node (e.g., provider edge node 140) in network 110 may receive all routes from route reflector 130 in response to creating a session with route reflector 130.

Provider edge nodes 140 of system 100 are connection points within network 110 that receive, create, store and/or send data along a path. Provider edge nodes 140 may include one or more redistribution points that recognize, process, and forward data to other nodes (e.g., customer edge node 150) of network 110. Provider edge nodes 140 may include virtual and/or physical provider edge nodes. In certain embodiments, one or more provider edge nodes 140 include data communications equipment such as switches, bridges, modems, hubs, and the like. In some embodiments, one or more provider edge nodes 140 include data terminal equipment such as routers, servers, printers, workstations, and the like. In certain embodiments, one or more provider edge nodes 140 are DFs. In the illustrated embodiment of FIG. 1, provider edge nodes 140 include provider edge node 140a, provider edge node 140b, and provider edge node 140c.

In certain embodiments, provider edge nodes 140 may be part of a multi-homing configuration. For example, provider edge nodes 140 may be part of the same multi-homing redundancy group. Provider edge nodes 140 may operate in all-active mode. Each provider edge node 140 may include a group of member ports. Each member port may have a different bandwidth capacity. Each provider edge node 140 of system 100 in a redundancy group may be provisioned with a group of member ports with different bandwidth capacities. For example, provider edge node 140a may include a first port having a first bandwidth capacity, a second port having a second bandwidth capacity, and a third port having a third bandwidth capacity.

In some embodiments, a bundle (e.g., an ES) may connect each provider edge node 140 to customer edge node 150. These ESs may be shared among different sets of EVIs. One or more provider edge nodes 140 may restrict the amount of bandwidth each EVI can use. For example, if an ES has a total of 100 gigabytes of capacity, provider edge node 140a of system 100 may distribute available bandwidth across EVI-1, EVI-2, and EVI-3 in ratio of 10 gigabytes, 50 gigabytes, and 40 gigabytes, respectively. In certain embodiments, data received by one or more provider edge nodes 140 may be associated with a multicast flow. The bandwidth requirements may be pre-defined per multicast flow. For example, the bandwidth requirements may be pre-defined for the dissemination of raw video. The data may have a constant bit rate and/or a pre-defined associated bandwidth requirement.

One or more provider edge nodes 140 within network 110 may receive incoming traffic from route reflector 130. The incoming traffic may include data communications and network traffic originating from networks external to network 110. The incoming traffic may be destined for customer edge node 150 within network 110. One or more provider edge nodes 140 may receive a request to route the incoming traffic through one or more links 160 within network 110. One or more provider edge nodes 140 may determine (e.g., calculate) which provider edge node 140 and associated link 160 should be used to route the incoming traffic.

One or more provider edge nodes 140 may determine which provider edge node 140 should route the incoming traffic based on the link bandwidth capacity associated with each provider edge node 140. For example, provider edge node 140a may determine a bandwidth capacity of link 160a between provider edge node 140a and customer edge node 150. Provider edge node 140a may determine a score for provider edge node 140a based on the bandwidth capacity of link 160a. Provider edge node 140a may calculate the score based on an identifier of provider edge node 140a, an identifier (e.g., an EVI identifier or a BD identifier) for the incoming data to be assigned, and the bandwidth capacity for link 160a. For example, provider edge node 140a may calculate a normalized hash value of the identifier for provider edge node 140a and the data identifier, calculate a natural logarithm of the normalized hash value, and divide the natural logarithm of the normalized hash value by the bandwidth capacity of link 160a to generate the score for provider edge node 140a.

Similarly, provider edge node 140a may determine a bandwidth capacity of link 160b between provider edge node 140b and customer edge node 150. Provider edge node 140a may determine a score for provider edge node 140b based on the bandwidth capacity of link 160b. Provider edge node 140a may calculate the score based on an identifier of provider edge node 140b, an identifier for the incoming data to be assigned, and the bandwidth capacity of link 160b. For example, provider edge node 140a may calculate a normalized hash value of the identifier for provider edge node 140b and the data identifier, calculate a natural logarithm of the normalized hash value, and divide the natural logarithm of the normalized hash value by the bandwidth capacity of link 160b to generate the score for provider edge node 140b.

In a like manner, provider edge node 140a may determine a bandwidth capacity of link 160c between provider edge node 140c and customer edge node 150. Provider edge node 140a may determine a score for provider edge node 140c based on the bandwidth capacity of link 160c. Provider edge node 140a may calculate the score based on an identifier of provider edge node 140c, an identifier for the incoming data to be assigned, and the bandwidth capacity of link 160c. For example, provider edge node 140a may calculate a normalized hash value of the identifier for provider edge node 140c and the data identifier, calculate a natural logarithm of the normalized hash value, and divide the natural logarithm of the normalized hash value by the bandwidth capacity of link 160c to generate the score for provider edge node 140c.

Provider edge node 140a may compare the scores for provider edge nodes 140a, 140b, and 140c to determine which provider edge node 140 has the highest score. Provider edge node 140a may assign the node (e.g., provider edge node 140a, 140b, or 140c) with the highest score to communicate the data to customer edge node 150. For example, if provider edge node 140a determines that the score for provider edge node 140b is higher than each of the scores for provider edge nodes 140a and 140c, provider edge node 140a may assign the data to provider edge node 140b. Provider edge node 140b then communicates the data to customer edge node 150 along link 160b.

If multiple provider edge nodes 140 have the same highest score, provider edge node 140 with the highest IP address is preferred. For example, if the scores for provider edge nodes 140a and 140b are equal, the scores for provider edge nodes 140a and 140b are higher than the score for provider edge node 140c, and the IP address of provider edge node 140a is higher than the IP address for provider edge node 140b, then provider edge node 140a assigns the data to itself. Provider edge node 140a then communicates the data to customer edge node 150 along link 160a.

In certain embodiments, the bandwidth capacity of one or more links 160 may change. For example, the bandwidth capacity of link 160a may be eliminated if provider edge node 140a is reprovisioned or inactivated. As another example, the available bandwidth capacity of link 160a may increase or decrease in accordance with one or more policies. If the bandwidth capacity of one or more links 160 changes, one or more provider edge nodes 140 may revise the score for provider edge node 140 associated with affected link 160. For example, if the bandwidth capacity of link 160a between provider edge node 140a and customer edge node 150 increases, only the scores for the data assigned to provider edge node 140a are recalculated. The scores for the data assigned to provider edge nodes 140b and 140c do not need to be recalculated.

In certain embodiments, protocol extensions are defined so that all provider edge nodes 140 are aware that assignments are determined in a weighted bandwidth context. For example, for DF election, each provider edge node 140 may be aware that the DF Election they are participating in is with respect to a weighted HRW. The property of consistent hashing/rendezvous hashing is retained.

Customer edge node 150 of system 100 is a connection point within network 110 that receives, creates, stores, and/or sends data. Customer edge node 150 may include one or more endpoints and/or one or more redistribution points that recognize data, process data, and/or forward data to other nodes of network 110. Customer edge node 150 may include virtual and/or physical customer edge nodes. In certain embodiments, customer edge node 150 includes data communications equipment such as switches, bridges, modems, hubs, and the like. In some embodiments, customer edge node 150 includes data terminal equipment such as routers, servers, printers, workstations, and the like. In certain embodiments, customer edge node 150 is a host device. Customer edge node 150 may receive incoming traffic from one or more provider edge nodes 140.

Links 160 (e.g., link 160a, link 160b, and link 160c) of system 100 are communication channels within network 110. Each link 160 connects two nodes of network 110. One or more links 160 of network 110 may be wired or wireless. One or more links 160 may include Ethernet links, ESs, and the like. Each link 160 has a bandwidth capacity. The bandwidth capacity of each link 160 is the capacity of the respective link to transmit data (e.g., a maximum amount of data) from one node (e.g., provider edge node 140a, 140b, or 140c) of network 110 to another node (e.g., customer edge node 150) of network 110 in a given amount of time (e.g., one second). Link 160a connects provider edge node 140a to customer edge node 150, link 160b connects provider edge node 140b to customer edge node 150, and link 160c connects provider edge node 140c to customer edge node 150. The bandwidth capacity of links 160a, 160b, and 160c of FIG. 1 is represented by the line thickness. Link 160a has a higher bandwidth capacity (which is represented by a thicker line) than links 160b and 160c. Link 160c has a higher bandwidth capacity than link 160b but a lower bandwidth capacity than link 160a.

In operation, provider edge node 140a of system 100 receives data from route reflector 130 of cloud environment 120. Provider edge node 140a determines a bandwidth capacity of link 160a between provider edge node 140a and customer edge node 150. Provider edge node 140a determines a score for provider edge node 140a by calculating a normalized hash value of the identifier for provider edge node 140a and the data identifier (e.g., an EVI identifier or a BD identifier), calculating a natural logarithm of the normalized hash value, and dividing the natural logarithm of the normalized hash value by the bandwidth capacity. Similarly, provider edge node 140a determines a score provider edge node 140b and provider edge node 140c based on the bandwidth capacities of links 160b and 160c, respectively. Provider edge node 140a then assigns the provider edge node with the highest score to communicate the data to customer edge node 150. As such, system 100 may be used to determine network component scores based on normalized hash values rather than normalized weights, which may reduce or eliminate disruptive remapping of data to provider edge nodes 140.

Although FIG. 1 illustrates a particular arrangement of network 110, cloud environment 120, route reflector 130, provider edge nodes 140, customer edge node 150, and links 160, this disclosure contemplates any suitable arrangement of network 110, cloud environment 120, route reflector 130, provider edge nodes 140, customer edge node 150, and links 160. For example, route reflector 130 of system 100 may not be located within cloud environment 120.

Although FIG. 1 illustrates a particular number of networks 110, cloud environments 120, route reflectors 130, provider edge nodes 140, customer edge nodes 150, and links 160, this disclosure contemplates any suitable number of networks 110, cloud environments 120, route reflectors 130, provider edge nodes 140, customer edge nodes 150, and links 160. For example, system 100 may include more or less than three provider edge nodes 140.

Although FIG. 1 describes and illustrates particular components performing particular actions of system 100, this disclosure contemplates any suitable combination of any suitable components, devices, or systems carrying out any suitable actions of system 100. For example, a network controller may perform one or more of the calculations described in FIG. 1.

FIG. 2 illustrates an example system for mapping objects to network components using network component scores. FIG. 2 includes the following network components: node N1, node N2, and node N3. Each node may represent a router, a server, and the like. In certain embodiments, node N1 may represent provider edge node 140a of FIG. 1, node N2 may represent provider edge node 140b of FIG. 1, and node N3 may represent provider edge node 140c of FIG. 1. The objects of FIG. 2 may represent the data received by provider edge nodes 140 of FIG. 1. Several nodes (e.g., nodes N1, N2, and N3) may have the ability to each process the same object.

FIG. 2 includes the following objects: object 233, object 318, and object 597. The modulo-N algorithm (i.e., the object identifier divided by the number of nodes) may not be suitable for mapping objects to network components. For example, when a node is removed or added (i.e., the number of nodes changes), disruptive remapping of the objects to the nodes may occur. Objects that were previously mapped to nodes that were not removed or added are often re-assigned. Two algorithms that solve this problem include consistent hashing and rendezvous hashing (e.g., HRW). In rendezvous hashing, a hash is computed from the concatenation of the node identifier (e.g., the node-id) and the object (e.g., the key). If the ith node is denoted by Ni, then the score for object Obj on node Ni is defined to be: Score (Obj, Ni)=Hash (Obj*Ni), where "*" denotes the concatenation. The designated node for object Obj is the node Nj for which Score (Obj, Sj) is highest (i.e., Score (Obj, Nj)>=Score (Obj, Ni), for all i=1, n, where n represents any suitable integer.) The node for which the hash value is the highest wins and is considered as the designated node for that object. In the case of a tie, the node with the highest IP address is preferred.

In the illustrated embodiment of FIG. 2, the scores for object 233 are calculated as follows: the hash of node N1 and object 233 (i.e., H(N1*233)) equals score 457; the hash of node N2 and object 233 (i.e., H(N2*233)) equals score 317, and the hash of node N3 and object 233 (i.e., H(N2*233)) equals score 512. Since 512 is the highest of the three scores, object 233 is assigned to node N3. Similarly, the scores for object 318 are calculated as follows: the hash of node N1 and object 318 (i.e., H(N1*318)) equals score 471; the hash of node N2 and object 318 (i.e., H(N2*318)) equals score 513, and the hash of node N3 and object 318 (i.e., H(N2*318)) equals score 172. Since 513 is the highest of the three scores, object 318 is assigned to node N2. Likewise, the scores for object 597 are calculated as follows: the hash of node N1 and object 597 (i.e., H(N1*597)) equals score 919; the hash of node N2 and object 597 (i.e., H(N2*597)) equals score 200, and the hash of node N3 and object 597 (i.e., H(N2*597)) equals score 706. Since 919 is the highest of the three scores, object 597 is assigned to node N1. As such, the objects are assigned to nodes based on network component scores calculated using HRW.

If node Nj goes down, then only those objects for which node Nj is the designated node need to be remapped. Other objects remain unaffected. Similarly, when a new node Nk comes up, node Nk will be the designated node for only those objects for which its hash with them is the highest. Rendezvous hashing may be applied in the load balancing context and also in many networking applications. Rendezvous hashing may also be used in the context of EVPN in the HRW DF Election, multicast, and port active applications. The underlying assumption for HRW is that all nodes are of the same capacities or "weight." When this assumption is not valid, the standard HRW algorithm may not be sufficient, as it will not result in a distribution of objects to nodes in the ratio of their weights.

FIG. 3 illustrates an example system 300 for determining network component scores using normalized weights. FIG. 3 includes the following network components: node N1, node N2, node N3, and node N4. Each node may represent a server, a router, and the like. Several nodes (e.g., nodes N1, N2, N3, and N4) can each process the same object. A weight is assigned to each node, and a normalized weighted hash is taken as the score. The four nodes N1, N2, N3, and N4 of FIG. 3, respectively, have the following different capacities (Wi): 50, 15, 20 and 15. An object with key-id 233 is to be assigned to a node. The nodes are assigned normalized weights as per their capacities. Node Ni is assigned a weight Wi/sum(Wi), where sum(Wi) is defined to be the sum of all the weights. In the illustrated embodiment of FIG. 3, sum (Wi) is 100. Accordingly, the weighted hash values are taken, and the object is assigned to node N1 since that weighted hash value associated with node N1 is the highest. This same process may be repeated for all the objects (e.g., objects 318 and 597 of FIG. 2).

In the illustrated embodiment of FIG. 3, the scores for object 233 are calculated as follows: the hash of node N1 and object 233 times weight W1 (i.e., (H(N1*233)*0.50) equals score 228.5; the hash of node N2 and object 233 times weight W2 (i.e., H(N2*233)*0.15) equals score 47.55, the hash of node N3 and object 233 times weight W3 (i.e., H(N3*233)*0.20) equals score 102.4; and the hash of node N4 and object 233 times weight W4 (H(N4*233)*0.15) equals score 35.4. Since 228.5 is the highest of the four scores, object 233 is assigned to node N1. Similar computations may be applied to other objects (e.g., objects 318 and 597 of FIG. 2).

In certain embodiments, the weight of a node may change. For example, the weight W2 of N2 may change from 15 to 25. Accordingly, the normalized value of each of the nodes (i.e., nodes N1, N2, N3, and N4) changes, and the normalized hash value is recomputed for each node. The process is repeated for each object. Because of this re-computation of every object with every node, movement of objects (e.g., Virtual Local Area Networks (VLANs)) across nodes (e.g., provider edge nodes) will likely occur.

FIG. 4 illustrates an example method 400 for determining network component scores using bandwidth capacity. Rather than using the normalized weight of the network component as illustrated in FIG. 3 above, the score is taken as: Wi/ln (hashn(Ni, Obj)), where: Wi represents the weight of the network component; Ni represents the identity of the network component; hashn represents the normalized hash value (e.g., a value between 0 and 1 but not including 0); and ln represents the natural logarithm of the normalized hash value. Accordingly, when Wi changes to Wi', only the computation of objects with node Ni needs to be performed again. The other nodes do not need to compute the weights again. An assumption in this method is that the hash is a uniform hashing function. Extrapolating this technique to the EVPN, the nodes are provider edge nodes, and the object identifiers are the EVI identities or BD identities. The object set may be the number of VLANs, EVIs, BDs, and the like.

The weight (Wi) of the network component is the bandwidth capacity of the link associated with the network component. For example, referring to FIG. 1, the weight Wi of provider edge node 140a is the bandwidth capacity of link 160a, the weight Wi of provider edge node 140b is the bandwidth capacity of link 160b, and the weight Wi of provider edge node 140c is the bandwidth capacity of link 160c. As such, assignments (e.g., DF election) of network components are determined in a weighted bandwidth context.

Method 400 begins at step 405. At step 410, a network node (e.g., provider edge node 140a of FIG. 1) of a network (e.g., network 110 of FIG. 1) receives data (e.g., an object) from a network component (e.g., route reflector 130 of FIG. 1). Method 400 then moves from step 410 to step 415, where the network node determines a first link bandwidth capacity between a first router (e.g., provider edge node 140a of FIG. 1) and a host device (e.g., customer edge node 150 of FIG. 1). In certain embodiments, the network node and the first router are the same network component. Method 400 then moves from step 415 to step 420.

At step 420, the network node determines a first score for the first router based on the first link bandwidth capacity. For example, the network node may determine a first router identifier for the first router and a data identifier for the data. In certain embodiments, the data identifier may be an EVI identifier or a BD identifier. The network node may use the first router identifier and the data identifier to calculate a normalized hash value of the first router identifier and the data identifier. The network node may calculate a natural logarithm of the normalized hash value and divide the natural logarithm of the normalized hash value by the first link bandwidth capacity to generate the first score. Method 400 then moves from step 420 to step 425.

At step 425, the network node determines a second link bandwidth capacity between a second router (e.g., provider edge node 140b of FIG. 1) and the host device. Method 400 then moves from step 425 to step 430, where the network node determines a second score for the second router based on the second link bandwidth capacity. For example, the network node may determine a second router identifier for the second router. The network node may use the second router identifier and the data identifier to calculate a normalized hash value of the second router identifier and the data identifier. The network node may calculate a natural logarithm of the normalized hash value and divide the natural logarithm of the normalized hash value by the second link bandwidth capacity to generate the second score. Method 400 then moves from step 430 to step 435.

At step 435, the network node determines whether the first score is different than the second score. If the first score is not different than the second score, method 400 moves from step 435 to step 440, where the network node determines whether the IP address of the first router is higher than the IP address of the second router. If the IP address of the first router is higher than the IP address of the second router, method 400 moves from step 440 to step 450, where the network node assigns the first router to communicate the data to the host device. If, at step 440, the network node determines that the IP address of the first router is not higher than the IP address of the second router, method 400 moves from step 440 to step 455, where the network node assigns the second router to communicate the data to the host device.

If, at step 435, the network node determines that the first score is different than the second score, method 400 moves from step 435 to step 445, where the network node determines whether the first score associated with the first router is higher than the second score associated with the second router. If the first score is higher than the second score, method 400 moves from step 445 to step 450, where the network node assigns the first router to communicate the data to the host device. If, at step 440, the network node determines that the first score is not higher than the second score, method 400 moves from step 445 to step 455, where the network node assigns the second router to communicate the data to the host device. Method 400 then moves from steps 450 and 455 to step 460, where method 400 ends. As such, method 400 determines network component scores based on bandwidth capacity using normalized hash values rather than normalized weights, which may reduce or eliminate disruptive remapping of data to routers.

Method 400 may reduce or eliminate the disruptive mapping of objects to nodes (e.g., servers). If the weight (represented as the bandwidth of link 160b of FIG. 1) of a node (e.g., provide edge node 140b of FIG. 1) changes, then the computation in the steps above pertaining to the logarithm are recalculated only for the objects (e.g., VLANs) that were previously assigned only to the node. Other objects that were previously assigned to other nodes (e.g., provider edge nodes 140a and 140c of FIG. 1) continue to be assigned as before. As such, method 400 reduces the assignment problem from a complexity of N*O (i.e., number of nodes× number of objects) to just O (i.e., number of objects).

Although this disclosure describes and illustrates particular steps of method 400 of FIG. 4 as occurring in a particular order, this disclosure contemplates any suitable steps of method 400 of FIG. 4 occurring in any suitable order. For example, step 410 directed to receiving data from a network component may be performed after steps 415 and 425 directed to determining link bandwidth capacities.

Although this disclosure describes and illustrates an example method 400 for determining network component scores using bandwidth capacity including the particular steps of the method of FIG. 4, this disclosure contemplates any suitable method 400 for determining network component scores using bandwidth capacity, including any suitable steps, which may include all, some, or none of the steps of the method of FIG. 4, where appropriate. For example, method 400 may include additional steps directed to determining a third link bandwidth capacity between a third router (e.g., provider edge node 140c of FIG. 1) and the host device, determining a third score for the third router based on the third link bandwidth capacity, determining the highest score, and assigning the router with the highest score to communicate the data to the host device.

Although this disclosure describes and illustrates particular components, devices, or systems carrying out particular steps of method 400 of FIG. 4, this disclosure contemplates any suitable combination of any suitable components, devices, or systems carrying out any suitable steps of method 400 of FIG. 4.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504.

Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media coupled to the one or more processors and comprising instructions that, when executed by the one or more processors, cause one or more routers to perform operations comprising:
receiving data from a network component;
determining a first link bandwidth capacity between a first router and a host device;
determining a first router identifier for the first router;
determining a data identifier for the data;
calculating a normalized hash value of the first router identifier and the data identifier;
calculating the natural logarithm of the normalized hash value;
determining a first score for the first router by dividing the natural logarithm of the normalized hash value by the first link bandwidth capacity;
determining a second link bandwidth capacity between a second router and the host device;
determining a second score for the second router based on the second link bandwidth capacity;
comparing at least the first score and the second score to determine a highest score; and
assigning an edge router associated with the highest score to communicate the data to the host device.

2. The system of claim 1, wherein the data identifier is associated with one of the following:
an ethernet virtual private network (EVPN) instance (EVI) identifier; and
a bridge domain (BD) identifier.

3. The system of claim 1, the operations further comprising:
determining that the second link bandwidth capacity between the second router and the host device has changed from the second link bandwidth capacity to a revised second link bandwidth capacity;
revising the second score for the second router based on the revised second link bandwidth capacity to generate a revised second score for the second router;
comparing at least the first score and the revised second score to determine a highest score; and
reassigning the edge router associated with the highest score to communicate the first data to the host device.

4. The system of claim 1, wherein the edge router associated with the highest score is a designated forwarder (DF) provider edge router.

5. The system of claim 1, wherein the data received from the network component is associated with a multicast flow.

6. The system of claim 1, wherein the network component is a router reflector for Border Gateway Protocol (BGP).

7. A method, comprising:
receiving, by a first router, data from a network component;
determining, by the first router, a first link bandwidth capacity between the first router and a host device;
determining, by the first router, a first router identifier for the first router;
determining, by the first router, a data identifier for the data;
calculating, by the first router, a normalized hash value of the first router identifier and the data identifier;

calculating, by the first router, the natural logarithm of the normalized hash value;
determining, by the first router, a first score for the first router by dividing the natural logarithm of the normalized hash value by the first link bandwidth capacity;
determining, by the first router, a second link bandwidth capacity between a second router and the host device;
determining, by the first router, a second score for the second router based on the second link bandwidth capacity;
comparing, by the first router, at least the first score and the second score to determine a highest score; and
assigning, by the first router, an edge router associated with the highest score to communicate the data to the host device.

8. The method of claim 7, wherein the data identifier is associated with one of the following:
an ethernet virtual private network (EVPN) instance (EVI) identifier; and
a bridge domain (BD) identifier.

9. The method of claim 7, further comprising:
determining, by the first router, that the second link bandwidth capacity between the second router and the host device has changed from the second link bandwidth capacity to a revised second link bandwidth capacity;
revising, by the first router, the second score for the second router based on the revised second link bandwidth capacity to generate a revised second score for the second router;
comparing, by the first router, at least the first score and the revised second score to determine a highest score; and
reassigning, by the first router, the edge router associated with the highest score to communicate the first data to the host device.

10. The method of claim 7, wherein the edge router associated with the highest score is a designated forwarder (DF) provider edge router.

11. The method of claim 7, wherein the data received from the network component is associated with a multicast flow.

12. The method of claim 7, wherein the network component is a router reflector for Border Gateway Protocol (BGP).

13. One or more computer-readable non-transitory storage media embodying instructions that, when executed by a processor, cause the processor to perform operations comprising:
receiving data from a network component;
determining a first link bandwidth capacity between a first router and a host device;
determining a first router identifier for the first router;
determining a data identifier for the data;
calculating a normalized hash value of the first router identifier and the data identifier;
calculating the natural logarithm of the normalized hash value;
determining a first score for the first router by dividing the natural logarithm of the normalized hash value by the first link bandwidth capacity;
determining a second link bandwidth capacity between a second router and the host device;
determining a second score for the second router based on the second link bandwidth capacity;
comparing at least the first score and the second score to determine a highest score; and
assigning an edge router associated with the highest score to communicate the data to the host device.

14. The one or more computer-readable non-transitory storage media of claim 5, wherein the data identifier is associated with one of the following:
an ethernet virtual private network (EVPN) instance (EVI) identifier; and
a bridge domain (BD) identifier.

15. The one or more computer-readable non-transitory storage media of claim 13, the operations further comprising:
determining that the second link bandwidth capacity between the second router and the host device has changed from the second link bandwidth capacity to a revised second link bandwidth capacity;
revising the second score for the second router based on the revised second link bandwidth capacity to generate a revised second score for the second router;
comparing at least the first score and the revised second score to determine a highest score; and
reassigning the edge router associated with the highest score to communicate the first data to the host device.

16. The one or more computer-readable non-transitory storage media of claim 13, wherein the edge router associated with the highest score is a designated forwarder (DF) provider edge router.

17. The one or more computer-readable non-transitory storage media of claim 13, wherein the data received from the network component is associated with a multicast flow.

* * * * *